(12) United States Patent
Huitt et al.

(10) Patent No.: US 10,925,202 B2
(45) Date of Patent: *Feb. 23, 2021

(54) PADDLE SCRAPER FOR ROLLING BASKET ATTACHMENT

(71) Applicant: Summers Manufacturing Company, Inc., Devils Lake, ND (US)

(72) Inventors: Jeff Huitt, Perry, IA (US); Michael Vogel, Ogden, IA (US); Austin Luellen, Minburn, IA (US); Nick Weber, Perry, IA (US)

(73) Assignee: Summers Manufacturing Company, Inc., Devils Lake, ND (US)

( * ) Notice: Subject to any disclaimer, the term of this patent is extended or adjusted under 35 U.S.C. 154(b) by 98 days.

This patent is subject to a terminal disclaimer.

(21) Appl. No.: 16/535,387

(22) Filed: Aug. 8, 2019

(65) Prior Publication Data

US 2019/0357415 A1  Nov. 28, 2019

Related U.S. Application Data

(63) Continuation of application No. 15/687,147, filed on Aug. 25, 2017, now Pat. No. 10,375,872.

(60) Provisional application No. 62/379,557, filed on Aug. 25, 2016.

(51) Int. Cl.
*A01B 29/06* (2006.01)
*A01B 29/04* (2006.01)
*A01B 76/00* (2006.01)

(52) U.S. Cl.
CPC ............ *A01B 29/06* (2013.01); *A01B 29/048* (2013.01); *A01B 76/00* (2013.01)

(58) Field of Classification Search
CPC ........ A01B 29/06; A01B 29/048; A01B 76/00
See application file for complete search history.

(56) References Cited

U.S. PATENT DOCUMENTS

| | | |
|---|---|---|
| 1,249,103 A | 12/1917 | Jansky |
| 2,582,199 A | 1/1952 | Gardner |
| 2,911,893 A | 11/1959 | Archibald |
| 3,269,285 A | 8/1966 | Lathers |
| 3,392,791 A | 7/1968 | Orthman |
| 3,714,913 A | 2/1973 | Gandrud |
| 3,897,830 A | 8/1975 | van der Lely |
| 3,910,712 A | 10/1975 | Guerin |
| 4,145,823 A | 3/1979 | Lucas |
| 4,342,365 A | 8/1982 | van der Lely |

(Continued)

FOREIGN PATENT DOCUMENTS

| | | |
|---|---|---|
| AT | 407817 B | 6/2001 |
| CN | 201563348 U | 9/2010 |

(Continued)

OTHER PUBLICATIONS

Standard Alloway Seedbetter Operator's Manual; Feb. 2010.

*Primary Examiner* — Tara Mayo-Pinnock
(74) *Attorney, Agent, or Firm* — Neustel Law Offices (57) ABSTRACT

An apparatus for use in a rolling basket of a tillage implement, the rolling basket comprising a plurality of elongated bars or blades spaced apart around a plurality of spaced apart rings, the bars or blades attached to the spaced apart rings, the apparatus includes an elongated support structure extending through a central axis of the rolling basket and a plurality of vertical stationary paddles spaced apart along the elongated support structure between the horizontally spaced apart rings.

20 Claims, 7 Drawing Sheets

(56) References Cited

U.S. PATENT DOCUMENTS

| | | |
|---|---|---|
| 4,374,546 A | 2/1983 | Mitchell |
| 4,610,567 A | 9/1986 | Hosking |
| 4,919,211 A | 4/1990 | Cope |
| 5,632,343 A | 5/1997 | Gengler |
| 7,143,837 B2 | 12/2006 | Dietrich, Sr. |
| 9,326,439 B2 | 5/2016 | Westlind |
| 9,462,737 B2 | 10/2016 | Westlind |
| 2003/0196823 A1 | 10/2003 | McDonald |
| 2013/0062084 A1 | 3/2013 | Casper |
| 2014/0209337 A1 | 7/2014 | Westlind |
| 2014/0262379 A1 | 9/2014 | Landoll |

FOREIGN PATENT DOCUMENTS

| | | |
|---|---|---|
| DE | 7812988 U1 | 9/1978 |
| EP | 1639876 B1 | 6/2008 |
| FR | 2488768 | 2/1982 |
| FR | 2586887 | 3/1987 |
| FR | 2804575 | 8/2001 |
| GB | 2145913 A | 4/1985 |
| JP | 2010094036 A | 4/2010 |
| JP | 2010200665 A | 9/2010 |
| RU | 2233571 | 8/2004 |
| WO | WO 2008/105727 | 9/2008 |

PADDLE SCRAPER FOR ROLLING BASKET ATTACHMENT

PRIORITY STATEMENT

The present application is a continuation of U.S. application Ser. No. 15/687,147 filed on Aug. 25, 2017 which issues as U.S. Pat. No. 10,375,872 on Aug. 13, 2019, which claims priority to U.S. Provisional Application No. 62/379,557 filed Aug. 25, 2016. Each of the aforementioned patent applications, and any applications related thereto, is herein incorporated by reference in their entirety.

FIELD OF THE INVENTION

The present invention relates to tillage implements. More particularly, but not exclusively, the present invention relates to the use of paddles within a rolling basket.

BACKGROUND

Rolling baskets are used on any number of different tillage implements including disks, field cultivators or finishers, rippers, or other vertical tillage tools. Using rolling baskets provides for improvement of the soil bed which can result in improved crop performance.

One of the problems with rolling baskets is that if the soil is wet they will get plugged with mud which is extremely problematic as it can be very labor intensive to remove the mud and the rolling basket's ability to function as it was intended can be severely hampered. One approach that has been used to remove the mud is described in EP1639876B1 to Kaastrup. Kasstrup describes using a scraper plate attached at the ends of the rolling basket to prevent build-up of soil adhering to the rolling basket. Despite this improvement, what is needed is an improved retrofit for tillage implements with rolling baskets.

SUMMARY

Therefore, it is a primary object, feature, or advantage of the present invention to improve over the state of the art.

It is a further object, feature, or advantage of the present invention to provide an apparatus which may be added to a tillage implement which already has a rolling basket without needing to replace the rolling basket.

It is a still further object, feature, or advantage of the present invention to allow for the use of paddles which may extend above inner, cylindrical support rings of the frame of a rolling basket in order to improve performance.

It is yet a further object, feature, or advantage of the present invention to provide a series of paddles presenting a series of paddle edges in close proximity to the rolling basket.

It is yet a another object, feature, or advantage of the present invention to provide a series of paddles presenting a sweep path extending outwardly from the rotational center of the rolling basket and terminating in paddle edges in close proximity to the rolling basket.

It is a still further object, feature, or advantage of the present invention to provide an apparatus which is easy to install.

Another object, feature, or advantage is to provide an apparatus which is effective at preventing mud build-up.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by any objects, features, or advantages stated herein.

According to one aspect, an apparatus for use in a rolling basket of a tillage implement, the rolling basket comprising a plurality of elongated bars or blades spaced apart around a plurality of spaced apart rings, the bars or blades attached to the spaced apart rings, the apparatus includes an elongated support structure extending through a central axis of the rolling basket and a plurality of generally vertical stationary paddles spaced apart along the elongated support structure between the horizontally spaced apart rings.

According to another aspect a method of retrofitting a rolling basket attachment is provided.

According to another aspect, an apparatus for a tillage implement includes a plurality of horizontally spaced apart rings, a plurality of soil engaging elongated bars or blades spaced apart around the plurality of spaced apart rings, the soil engaging bars or blades attached to the spaced apart rings to form a rolling basket, an elongated support structure extending along a central axis of the rolling basket, and a plurality of stationary paddles secured to the elongated support structure and inter-spaced along the elongated support structure between the horizontally spaced apart rings. The plurality of stationary paddles may include first and second end paddles and a plurality of inner paddles between the first and second end paddles. The apparatus may further include first and second opposite wing plates wherein the first wing plate is secured to the first end paddle and wherein the second wing plate is secured to the second end paddle. The first end of the elongated support structure may be secured to the first end paddle inward from the first wing plate and a second end of the elongated support structure may be secured to the second end paddle inward from the second wing plate. The apparatus may further include a first box assembly including a top, a first side, a second side and the first wing plate and a second box assembly including a top, a first side, a second side and the second wing plate. The apparatus may further include a first bracket and a second bracket on opposite ends of the rolling basket. The first bracket may be secured to a first end of the elongated support structure through the first box assembly and the second bracket may be secured to a second end of the elongated support structure through the second box assembly. The stationary paddles may be generally vertical.

According to another aspect, an apparatus is provided for retrofitting a tillage implement having a plurality of spaced apart horizontal rings, a plurality of elongated bars or blades spaced apart around the plurality of spaced apart horizontal rings, the bars or blades attached to the spaced apart rings to form a rolling basket. The apparatus may include an elongated support structure extending along a middle portion of a central axis of the rolling basket, and plurality of stationary paddles secured to the elongated support structure and inter-spaced along the elongated support structure between the horizontally spaced apart rings.

BRIEF DESCRIPTION OF THE DRAWINGS

Illustrated embodiments of the disclosure are described in detail below with reference to the attached drawing figures, which are incorporated by reference herein.

DETAILED DESCRIPTION

Figure 1:
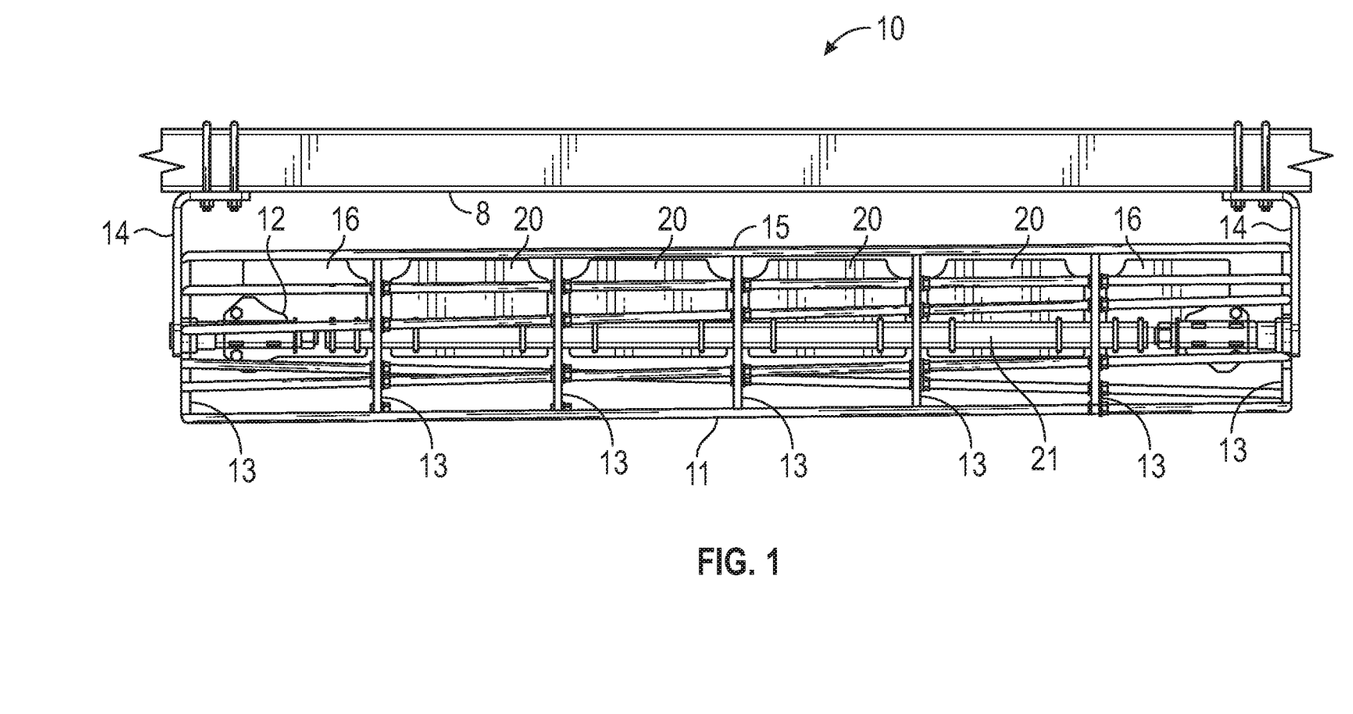
FIG. 1 illustrates a view of the paddle assembly installed on a bar of a tillage implement.

FIG. 1 illustrates a view of an assembly 10 operatively connected to a tillage implement. The assembly 10 includes a bar 8 which forms a part of the tillage implement and a rolling basket 11 which forms a part of the tillage implement. The tillage implement may be of any number of different types including tillage implements including disks, field cultivators or finishers, rippers, or other vertical tillage tools. A paddle assembly 12 is installed within the rolling basket 11. The rolling basket 11 may be of any number of commercially available types including those from Deere or CNH. Traditional rolling baskets of the type pictorially illustrated include soil engaging elongated bars or blades 15 extending between opposing ends. The elongated bars 15 are mounted to and supported by a series of horizontally spaced apart cylindrical support rings 13 placed at desired intervals between the opposing ends of the rolling basket 11. The ends of the elongated bars 8 may be secured to a hub assembly at each end of the rolling basket. The rolling basket 11 and elongated bars 15 are rotationally supported by the end-mounted, hub assemblies. Mounted to the cylindrical support rings 13 the elongated bars 8 form an elongated, cylindrical rolling basket 11. The elongated bars 8 have a generally shallow depth and therefore their elongated surface area resides predominantly at the outer circumference of the cylindrical support rings 13. The paddle assembly 12 shown in FIG. 1 includes a plurality of paddles 16, 20 positioned within the rolling basket 11 to assist in preventing mud from building up within the rolling basket 11.

The paddle assembly 12 includes an elongated paddle support member 21 mounted at the center of rotation of the rolling basket. Brackets 14 are located at opposing ends of the rolling basket 11. In operation, the rolling basket 11 rotates around the paddle assembly 12. In addition, note that the use of paddles 16, 20 is advantageous over the use of a continuous blade or edge across the length of the rolling basket, because the top edge of each paddle 16, 20 can extend to the outer circumference of the cylindrical support rings 13 in close or near-touching proximity to the elongated bars 8 of the rolling basket 11 thereby further preventing mud from building up on the elongated bars 8 and within the rolling basket 11. In addition, the paddle assembly 12 may be retrofitted to an existing rolling basket as each paddle 16, 20 may be separately secured to the elongated paddle support member 21 without removing the inner rings 13 or bars 8 of the roller basket. The end paddles 16 may then be connected to the end fittings.

Figure 2:
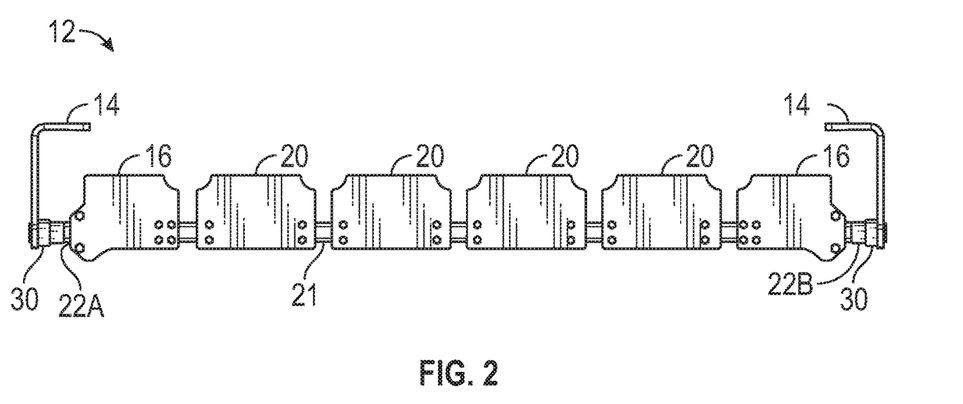
FIG. 2 further illustrates the paddle assembly as viewed from the rear of the tillage implement.

FIG. 2 further illustrates the paddle assembly 12 outside of the rolling basket shown in FIG. 1. There are opposite support brackets 14 shown on opposite ends of the paddle assembly 12. In addition, there are a series of paddles which includes paddles 16, 20. Note that the paddles 16 on the respective ends have a different configuration then the inner paddles 20. Each of the paddles 16 on the end is connected to a fitting 22A, 22B. Each of the paddles 16 on the end is secured to a wing plate which forms a portion of a box assembly which is in turn bolted to the bearings of the rolling basket through a bushing, thereby forming the fitting 22A, 22B.

Figure 3:
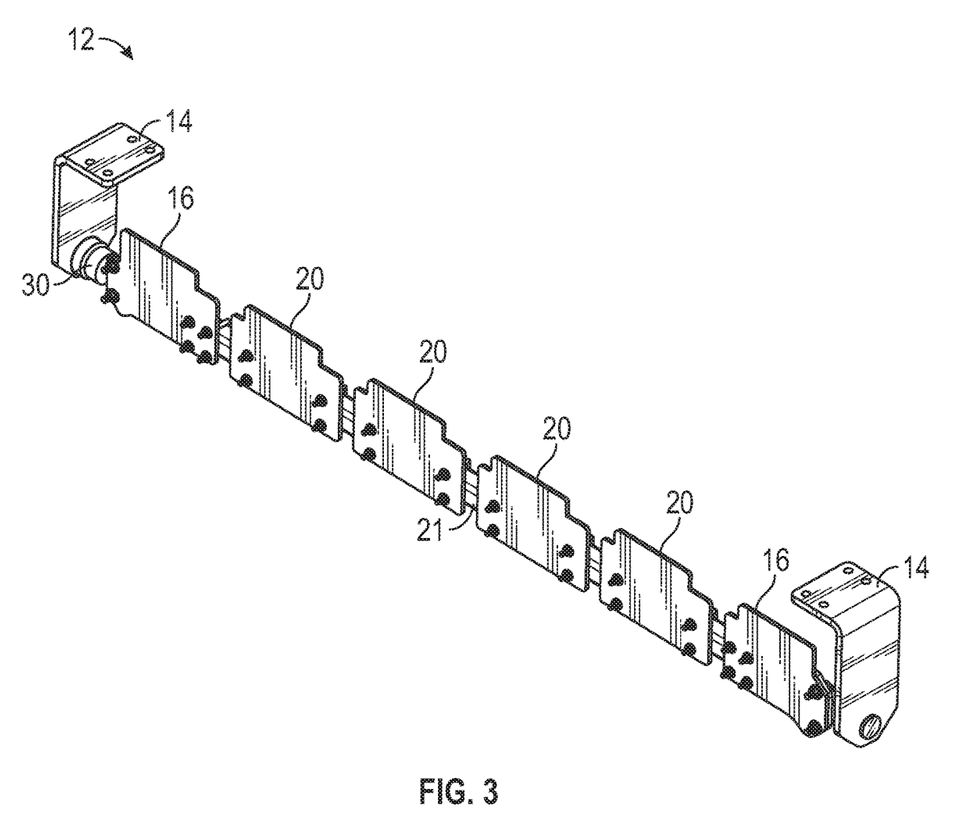
FIG. 3 is a perspective view of the paddle assembly.
Figure 4:
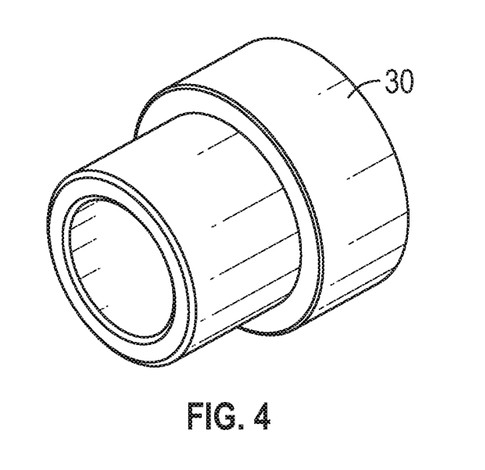
FIG. 4 illustrates a bushing.
Figure 5:
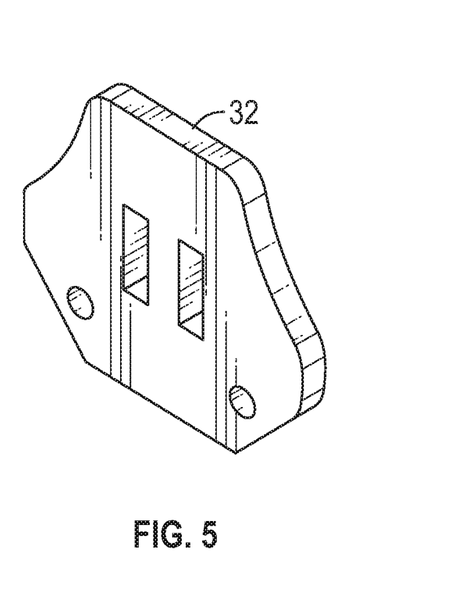
FIG. 5 illustrates a wing plate.
Figure 6:
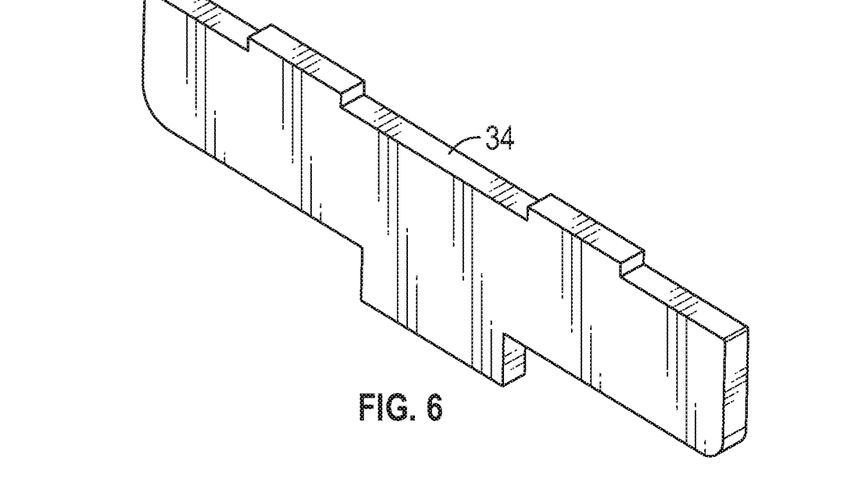
FIG. 6 illustrates a box side.
Figure 7:
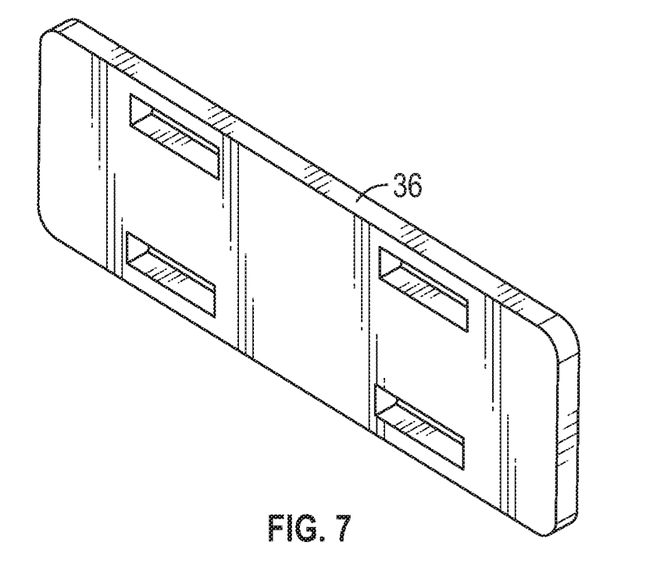
FIG. 7 illustrates a box top.
Figure 8:
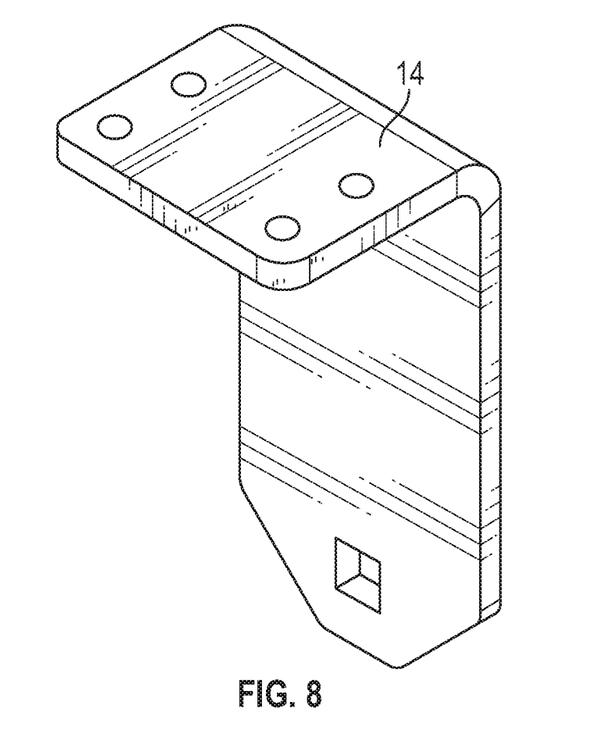
FIG. 8 illustrates an L-bracket.
Figure 9:
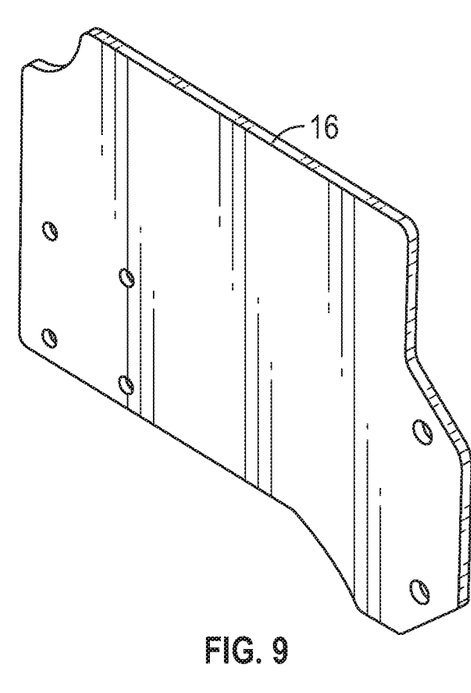
FIG. 9 illustrates an end paddle.
Figure 10:
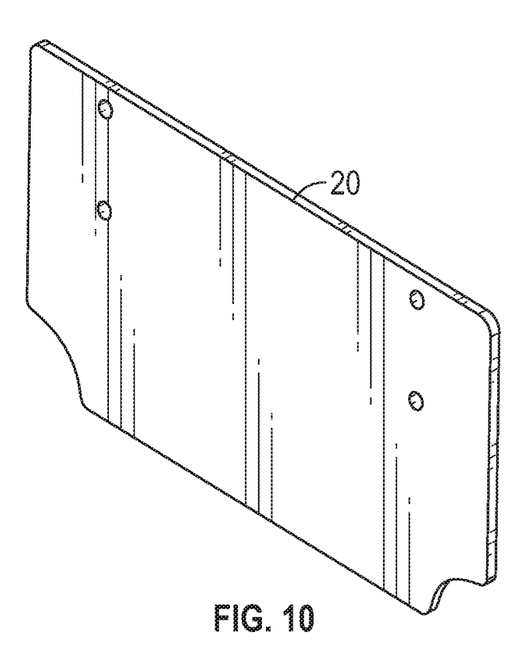
FIG. 10 illustrates an individual middle paddle.

FIG. 3 is a perspective view of the paddle assembly 12 which better shows the brackets 14. The paddle assembly 12 is operatively connected to a bar of an implement using the brackets 14. FIG. 4 illustrates a bushing 30. The bushing 30 may be positioned at the opposite support brackets. FIG. 5 illustrates a wing plate 32. Opposite wing plates 32 are present near each end of the paddle assembly. FIG. 6 illustrates a box side 34. FIG. 7 illustrates a box top 36. FIG. 8 illustrates an L-bracket 14. There is a square opening at the bottom of the bracket. FIG. 9 illustrates an end paddle 16. FIG. 10 illustrates an individual middle or inner paddle 20.

Figure 11:
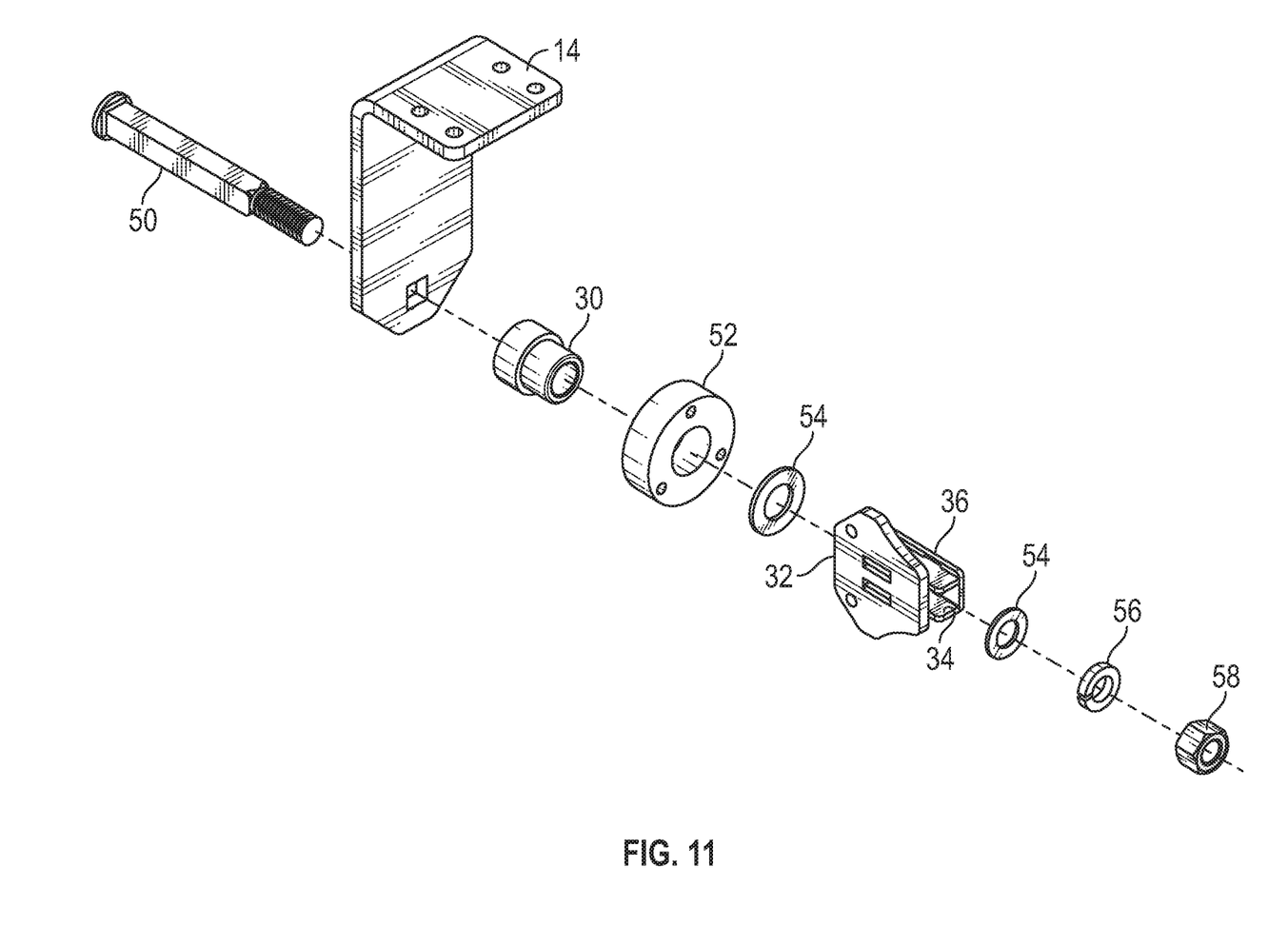
FIG. 11 is an exploded view of a bearing assembly.

FIG. 11 is an exploded view of a bearing assembly. A bracket 14 is shown. A bolt 50 may be inserted through an aperture in the bracket 14 and through a bushing 30, through a bearing 52, through a washer 54, along an assembly formed from a box assembly with a box side 34, a box top 36, and a wing plate 32, through washer 54, a spring lock washer 36, and secured with a hex nut 58.

Figure 12:
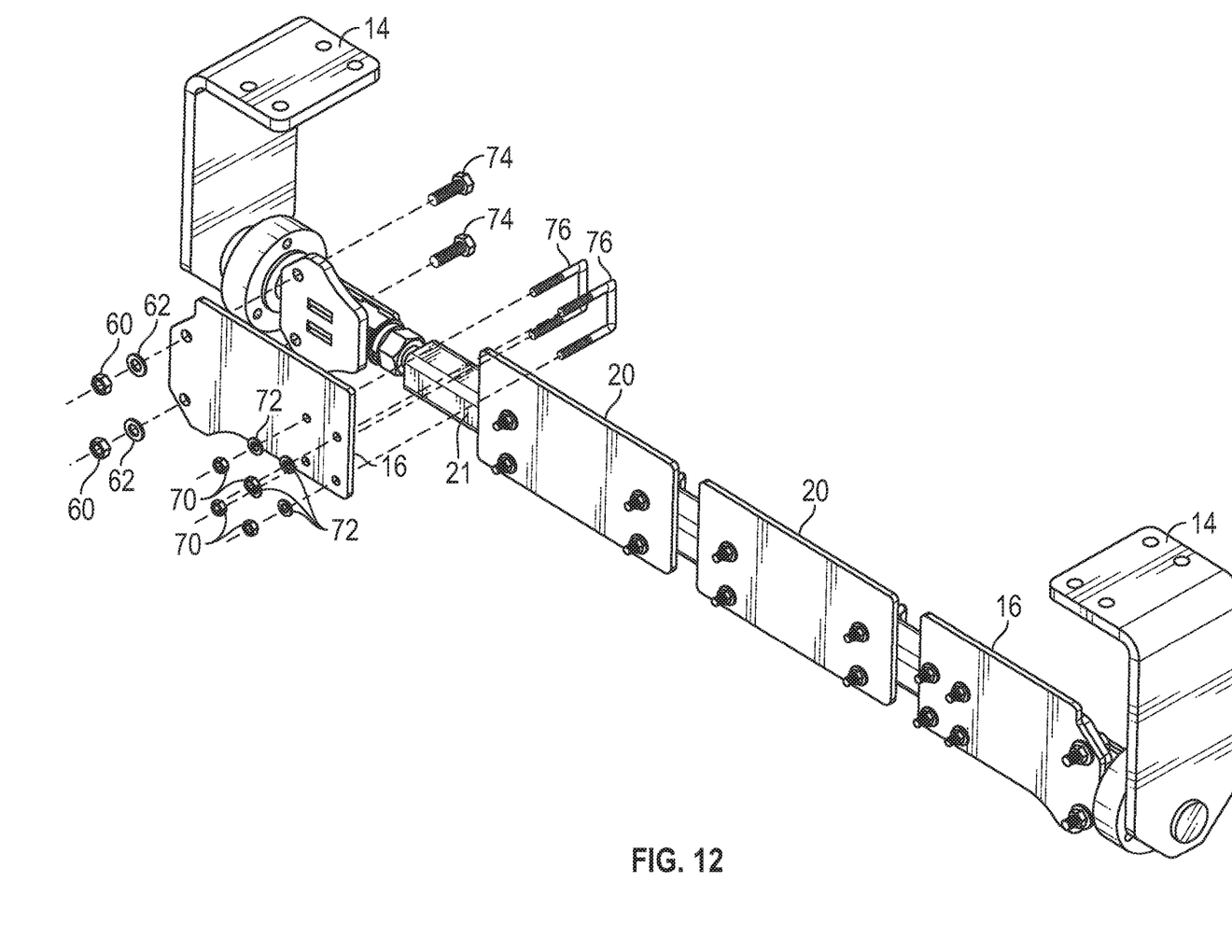
FIG. 12 is a view of the paddle assembly with an exploded view of an end paddle.

FIG. 12 is a view of the paddle assembly with an exploded view of an end paddle 16. The end paddle 16 is secured to a wing plate 32 with bolts 74, washers 62, and hex nuts 60. U-bolts 76, washers 72, and hex nuts 70 further secure the end paddle 16 with the paddle support member 21.

The present invention provides numerous advantages. First, the paddle assembly 12 may be retrofitted to existing tillage implements with rolling baskets. Thus, a farmer need not replace the rolling basket they already have thereby reducing costs. Second, the use of paddles as opposed to elongated blades allows for the paddles to be positioned higher than would otherwise be possible thus improving the ability to prevent mud from building up within the rolling basket. Third, the manner in which the paddle assembly 12 connects to the rolling basket through the fittings better adapts the paddle assembly 12 to fitting a wide range of different rolling baskets from different manufacturers.

The invention is not to be limited to the particular embodiments described herein. In particular, the invention contemplates numerous variations in size, shape, and structure. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes or methods of the invention. It is understood that any other modifications, substitutions, and/or additions can be made, which are within the intended spirit and scope of the invention.

What is claimed is:

1. An apparatus for a tillage implement, the apparatus comprising:
    a rolling basket having a plurality of support rings horizontally spaced apart from one another and a plurality of soil engaging elongated bars or blades attached to the plurality of support rings, wherein the plurality of soil engaging elongated bars or blades are spaced apart around the plurality of support rings;
    an elongated support member mounted within the rolling basket; and a plurality of stationary paddles extending from the elongated paddle support member, wherein the plurality of stationary paddles are positioned within an interior of the rolling basket in a stationary manner;

wherein the plurality of stationary paddles are spaced apart along the elongated support member between the horizontally spaced apart rings;

wherein a plurality of slots are formed between the plurality of stationary paddles, wherein the plurality of slots are aligned with and receive the plurality of support rings so that a distal portion of the plurality of stationary paddles extend past the plurality of support rings.

2. The apparatus of claim 1, further comprising a first bracket and a second bracket on opposite ends of the rolling basket.

3. The apparatus of claim 2, wherein the first bracket is secured to a first end of the elongated support member and wherein the second bracket is secured to a second end of the elongated support member.

4. The apparatus of claim 1, wherein the stationary paddles are generally vertical.

5. The apparatus of claim 1, wherein the plurality of stationary blades extend outwardly from an axis.

6. The apparatus of claim 5, wherein the axis is comprised of the central axis of the rolling basket.

7. The apparatus of claim 1, further comprising a first wing plate and a second wing plate, wherein the first wing plate is secured to a first end stationary paddle of the plurality of stationary paddles and wherein the second wing plate is secured to a second end stationary paddle of the plurality of stationary paddles.

8. The apparatus of claim 1, wherein the elongated support member is mounted at a center of rotation of the rolling basket.

9. The apparatus of claim 1, wherein the plurality of paddles are each removably attached to the elongated support member.

10. The apparatus of claim 9, wherein the plurality of paddles are each removably attached to the elongated support member by a plurality of fasteners.

11. A tillage implement, the apparatus comprising:
a tillage implement comprised of a disk, a field cultivator, a finisher, a ripper, or a vertical tillage tool;
a rolling basket rotatably mounted to the tillage implement, wherein the rolling basket comprises a plurality of support rings horizontally spaced apart from one another and a plurality of soil engaging elongated bars or blades attached to the plurality of support rings, wherein the plurality of soil engaging elongated bars or blades are spaced apart around the plurality of support rings;
an elongated support member mounted within the rolling basket; and
a plurality of stationary paddles extending from the elongated paddle support member, wherein the plurality of stationary paddles are positioned within an interior of the rolling basket in a stationary manner;
wherein the plurality of stationary paddles are spaced apart along the elongated support member between the horizontally spaced apart rings;

wherein a plurality of slots are formed between the plurality of stationary paddles, wherein the plurality of slots are aligned with and receive the plurality of support rings so that a distal portion of the plurality of stationary paddles extend past the plurality of support rings.

12. The tillage implement of claim 11, further comprising a first bracket and a second bracket on opposite ends of the rolling basket.

13. The tillage implement of claim 12, wherein the first bracket is secured to a first end of the elongated support member and wherein the second bracket is secured to a second end of the elongated support member.

14. The tillage implement of claim 11, wherein the stationary paddles are generally vertical.

15. The tillage implement of claim 11, wherein the plurality of stationary blades extend outwardly from an axis.

16. The tillage implement of claim 15, wherein the axis is comprised of the central axis of the rolling basket.

17. The tillage implement of claim 11, further comprising a first wing plate and a second wing plate, wherein the first wing plate is secured to a first end stationary paddle of the plurality of stationary paddles and wherein the second wing plate is secured to a second end stationary paddle of the plurality of stationary paddles.

18. The tillage implement of claim 11, wherein the elongated support member is mounted at a center of rotation of the rolling basket.

19. The tillage implement of claim 11, wherein the plurality of paddles are each removably attached to the elongated support member by a plurality of fasteners.

20. An apparatus for a tillage implement, the apparatus comprising:
a rolling basket having a plurality of support rings horizontally spaced apart from one another and a plurality of soil engaging elongated bars or blades attached to the plurality of support rings, wherein the plurality of soil engaging elongated bars or blades are spaced apart around the plurality of support rings;
an elongated support member mounted within the rolling basket; and
a plurality of stationary paddles extending from the elongated paddle support member, wherein the plurality of stationary paddles are positioned within an interior of the rolling basket in a stationary manner;
wherein the plurality of stationary paddles are spaced apart along the elongated support member between the horizontally spaced apart rings;
wherein a plurality of slots are formed between the plurality of stationary paddles, wherein the plurality of slots are aligned with and receive the plurality of support rings so that a distal portion of the plurality of stationary paddles extend past the plurality of support rings;
a first bracket and a second bracket on opposite ends of the rolling basket, wherein the first bracket is secured to a first end of the elongated support member and wherein the second bracket is secured to a second end of the elongated support member;
wherein the stationary paddles are generally vertical.

* * * * *

UNITED STATES PATENT AND TRADEMARK OFFICE
CERTIFICATE OF CORRECTION

Page 1 of 2

PATENT NO. : 10,925,202 B2
APPLICATION NO. : 16/535387
DATED : February 23, 2021
INVENTOR(S) : Jeff Huitt et al.

It is certified that error appears in the above-identified patent and that said Letters Patent is hereby corrected as shown below:

In the Claims

Claim 1, Column 5, Lines 1 and 2, "a plurality of stationary paddles extending from the elongated paddle support member, wherein the plurality" should read -- a plurality of stationary paddles extending from the elongated support member, wherein the plurality --

Claim 1, Column 5, Line 7, "horizontally spaced apart rings" should read -- plurality of support rings --

Claim 4, Column 5, Lines 21 and 22, "wherein the stationary paddles are generally vertical" should read -- wherein the plurality of stationary paddles are generally vertical --

Claim 5, Column 5, Lines 23 and 24, "wherein the plurality of stationary blades extend outwardly from an axis" should read -- wherein the plurality of stationary paddles extend outwardly from an axis --

Claim 6, Column 5, Line 26, "of the central axis of the rolling basket" should read -- of a central axis of the rolling basket --

Claim 9, Column 5, Lines 37 and 38, "paddles are each removably attached to the elongated support member" should read -- stationary paddles are each removably attached to the elongated support member --

Claim 10, Column 5, Lines 40 and 41, "paddles are each removably attached to the elongated support member by a plurality of fasteners" should read -- stationary paddles are each removably attached to the elongated support member by a plurality of fasteners --

Claim 11, Column 5, Line 42, "A tillage implement, the apparatus comprising:" should read -- A tillage implement, comprising: --

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,925,202 B2

Claim 11, Column 5, Lines 55 and 56, "a plurality of stationary paddles extending from the elongated paddle support member, wherein the plurality of" should read -- a plurality of stationary paddles extending from the elongated support member, wherein the plurality of --

Claim 11, Column 5, Lines 60 and 61, "apart along the elongated support member between the horizontally spaced apart rings" should read -- apart along the elongated support member between the plurality of support rings --

Claim 14, Column 6, Line 15, "stationary paddles are generally vertical" should read -- plurality of stationary paddles are generally vertical --

Claim 15, Column 6, Line 17, "plurality of stationary blades extend outwardly from an axis" should read -- plurality of stationary paddles extend outwardly from an axis --

Claim 16, Column 6, Line 19, "comprised of the central axis of the rolling basket" should read -- comprised of a central axis of the rolling basket --

Claim 19, Column 6, Line 30, "plurality of paddles are each removably attached to the" should read -- plurality of stationary paddles are each removably attached to the --

Claim 20, Column 6, Lines 42 and 43, "a plurality of stationary paddles extending from the elongated paddle support member, wherein the plurality of" should read -- a plurality of stationary paddles extending from the elongated support member, wherein the plurality of --

Claim 20, Column 6, Line 48, "horizontally spaced apart rings" should read -- plurality of support rings --

Claim 20, Column 6, Line 60, "wherein the stationary paddles are generally vertical" should read -- wherein the plurality of stationary paddles are generally vertical --